US012636221B2

(12) United States Patent
Wang et al.

(10) Patent No.: US 12,636,221 B2
(45) Date of Patent: May 26, 2026

(54) EXOSKELETON ROBOT FOR EXPECTORATION ASSISTANCE AND CONTROL METHOD

(71) Applicants: BEIHANG UNIVERSITY, Beijing (CN); PEKING UNIVERSITY THIRD HOSPITAL (THE THIRD CLINICAL MEDICAL SCHOOL OF PEKING UNIVERSITY), Beijing (CN)

(72) Inventors: Dangxiao Wang, Beijing (CN); Qinggang Ge, Beijing (CN); Yan Zhang, Beijing (CN); Yuru Zhang, Beijing (CN); Zongyu Wang, Beijing (CN); Lei Xue, Beijing (CN)

(73) Assignees: Beihang University, Beijing (CN); Peking University Third Hospital (The Third Clinical Medical School Of Peking University), Beijing (CN)

( * ) Notice: Subject to any disclaimer, the term of this patent is extended or adjusted under 35 U.S.C. 154(b) by 939 days.

(21) Appl. No.: 17/908,420

(22) PCT Filed: Jul. 8, 2021

(86) PCT No.: PCT/CN2021/105213
§ 371 (c)(1),
(2) Date: Aug. 31, 2022

(87) PCT Pub. No.: WO2022/217767
PCT Pub. Date: Oct. 20, 2022

(65) Prior Publication Data
US 2023/0210711 A1 Jul. 6, 2023

(51) Int. Cl.
*A61H 9/00* (2006.01)

(52) U.S. Cl.
CPC ......... *A61H 9/0057* (2013.01); *A61H 9/0078* (2013.01); *A61H 2201/0107* (2013.01);
(Continued)

(58) Field of Classification Search
CPC ................ A61H 9/0057; A61H 9/0078; A61H 2201/0107; A61H 2201/1238;
(Continued)

(56) References Cited

U.S. PATENT DOCUMENTS

| | | | | |
|---|---|---|---|---|
| 2009/0171256 A1* | 7/2009 | Fiorina | A61H 31/02 601/44 |
| 2017/0020768 A1* | 1/2017 | Palmer | A61H 31/02 |
| 2019/0105225 A1* | 4/2019 | Brenner | A61H 9/005 |

* cited by examiner

*Primary Examiner* — Kendra D Carter
*Assistant Examiner* — Arielle Wolff
(74) *Attorney, Agent, or Firm* — Tutunjian & Bitetto, P.C.

(57) ABSTRACT

The present disclosure relates to an exoskeleton robot for expectoration assistance and a control method. In the exoskeleton robot, a respiratory sensor acquires a respiratory signal of a user to be assisted; a positive pressure module covers an upper abdomen of the user to be assisted; a negative pressure module is arranged on an outer wall of a thoracic cavity of the user to be assisted and wraps the whole thoracic cavity, and a negative pressure cavity is formed between a housing of the negative pressure module and the outer wall of the thoracic cavity; in an inhalation state, the rigidity of the housing of the negative pressure module increases; in an exhalation state, the rigidity of the housing of the negative pressure module decreases; the control module is respectively connected with the respiratory sensor, the positive pressure module, and the negative pressure module.

14 Claims, 3 Drawing Sheets

(52) U.S. Cl.
CPC ................ *A61H 2201/1238* (2013.01); *A61H 2201/165* (2013.01); *A61H 2201/5007* (2013.01); *A61H 2201/5056* (2013.01); *A61H 2205/083* (2013.01); *A61H 2230/405* (2013.01)

(58) Field of Classification Search
CPC ...... A61H 2201/165; A61H 2201/5007; A61H 2201/5056; A61H 2205/083; A61H 2230/405; A61H 9/0092; A61H 2201/1246; A61H 2201/1619; A61H 2201/1659; A61H 2201/169; A61H 2203/0431; A61H 31/02; A61H 2201/5071; A61H 2205/084; A61H 2230/425; A61H 7/00; A61H 9/005; A61H 2031/003; A61H 2205/08; A61F 5/00; A61B 5/08
See application file for complete search history.

EXOSKELETON ROBOT FOR EXPECTORATION ASSISTANCE AND CONTROL METHOD

CROSS REFERENCE TO RELATED APPLICATION

This patent application claims the benefit and priority of Chinese Patent Application No. 202110409204.0, entitled "EXOSKELETON ROBOT FOR EXPECTORATION ASSISTANCE AND CONTROL METHOD" filed on Apr. 16, 2021, the disclosure of which is incorporated by reference herein in its entirety as part of the present application.

TECHNICAL FIELD

The present disclosure relates to the field of soft exoskeletons, and particularly relates to an exoskeleton robot for expectoration assistance and a control method.

BACKGROUND ART

Currently, there are more than 3 million patients with spinal cord injury (SCI) worldwide. With the elevation of the injured segment, such patients will have different degrees of limb and trunk muscle movement disorders in addition to the weakening or disappearance of sensation in different areas. When muscles responsible for inhalation and exhalation lose spinal innervation, weakness or loss of the muscle strength will occur. The decrease of the muscle strength of inspiratory muscles may cause respiratory failure. Expiratory muscles are the key muscles involved in the process of coughing and expectoration, and once denervated, the muscle strength will decrease, which will inevitably lead to the weakening of the coughing ability. Most of the expiratory muscle groups are innervated by thoracic spinal nerves, and the level of cervical SCI is higher than the thoracic spinal cord, so the muscle strength of the expiratory muscles below the level after injury will be reduced to varying degrees. As a result, the patient's ability to cough and expectorate is reduced, the airway clearance ability is impaired, and the sputum in the respiratory tract is easily retained, which may easily lead to complications such as pulmonary infection and atelectasis, and even lead to respiratory tract obstruction in severe cases, endangering the patient's life. To solve the problem of airway clearance, the patient often requires tracheostomy to remove sputum from the airway by artificially assisting aspiration of sputum. Research shows that the ASIA class A, which represents complete SCI, is considered as a risk factor for tracheostomy (Analysis of the risk factors for tracheostomy and decannulation after traumatic cervical spinal cord injury in an aging population. Spinal Cord 57, 843-849 (2019)). This also shows that the more severe the SCI, the more the need for tracheostomy. However, while the tracheostomy solves the problem of expectoration, it also brings various disadvantages because of its non-physiological method. After the tracheostomy, the patient cannot speak, and swallowing is impaired, which hinders the patient's verbal communication with family members and oral feeding, thereby not only increasing the workload of nursing, but also easily causing psychological disorders and greatly reducing the quality of life. A series of complications such as catheter prolapse, soft tissue infection and tracheal dilatation may also be caused under long-term use of the tracheostomy site, which also threatens the patient's life. Therefore, how to solve the problem of cough and expectoration of patients with SCI, especially patients with cervical SCI, in the most physiological way has become an urgent clinical problem to be solved. In addition, with the advent of an aging society, respiratory diseases are the main health problems that contribute to the disease burden of the elderly.

Therefore, in order to meet the needs of the patients with SCI and the elderly for expectoration ability recovery and respiratory function rehabilitation exercise, there is an urgent need for a non-invasive, woundless, portable, low-cost and domestic respiratory function rehabilitation training device, so as to meet the needs of assisting patients in recovering the expectoration ability and strengthening the respiratory function exercise. As a result, respiratory rehabilitation devices are applied from ICU to daily life such as home and travel.

SUMMARY

The present disclosure aims to provide an exoskeleton robot for expectoration assistance and a control method, so as to achieve the goal of non-invasive, efficient and intelligent cough assistance for a user to be assisted, and meets the needs of the user to be assisted in recovering the expectoration ability and strengthening the respiratory function exercise.

The technical solutions of the present disclosure are as follows:

An exoskeleton robot for expectoration assistance includes: a respiratory sensor, a positive pressure module, a negative pressure module and a control module, where

- the respiratory sensor is configured to acquire a respiratory signal of a user to be assisted;
- the respiratory signal including: a respiratory flow rate and an airway pressure;
- the positive pressure module is configured to cover an upper abdomen of the user to be assisted;
- the negative pressure module is configured to be arranged on an outer wall of a thoracic cavity of the user to be assisted and is configured to be wrap the whole thoracic cavity, where a closed cavity is formed between a housing of the negative pressure module and the outer wall of the thoracic cavity of the user to be assisted; the closed cavity being a negative pressure cavity; where when the user to be assisted needs expectoration, a rigidity of the housing of the negative pressure module increases; and where when the user to be assisted completes expectoration, the rigidity of the housing of the negative pressure module decreases;
- the control module is respectively connected with the respiratory sensor, the positive pressure module and the negative pressure module;
- the control module is configured to: determine whether the user to be assisted is in an inhalation state according to the respiratory signal; control the negative pressure cavity to pump negative pressure when the user to be assisted is in an inhalation state, and control the negative pressure module to be in direct communication with an external environment after the inhalation is completed; and control the positive pressure module to inflate when the user to be assisted is in an exhalation state.

Optionally, the positive pressure module includes: a soft drive device and a restraining strap; and where:

- the soft drive device is fixed on the restraining strap, the soft drive device configured to cover the upper abdomen of the user to be assisted and deform toward the user;

the restraining strap is configured to limit deformation of the soft drive device, a length of the restraining strap remaining unchanged during the deformation of the soft drive device; and a tensile rigidity of the restraining strap is greater than an impedance of the soft drive device.

Optionally, the soft drive device is a soft paper folding unit, an inflation tube or an air bag.

Optionally, the control module includes: a positive pressure control unit and a negative pressure control unit; where the positive pressure control unit is configured to control an inflation and deflation time and pressure magnitude of the soft drive device; and the negative pressure control unit is configured to control the pressure of each of the negative pressure cavity and the housing of the negative pressure module.

Optionally, the positive pressure control unit includes: a positive pressure pump, a positive pressure regulating valve, a positive pressure switch valve, a first negative pressure switch valve and a first controller;

where the positive pressure pump, the positive pressure regulating valve, the positive pressure switch valve and the first negative pressure switch valve are all connected with the first controller; and where both the positive pressure switch valve and the first negative pressure switch valve are in communication with the soft drive device.

Optionally, the negative pressure control unit includes: a vacuum pump, a first negative pressure regulating valve, a second negative pressure switch valve, a second negative pressure regulating valve, a third negative pressure switch valve and a second controller; where:

the vacuum pump is in communication with the housing of the negative pressure module through the first negative pressure regulating valve and the second negative pressure switch valve;

the vacuum pump is in communication with the negative pressure cavity through the second negative pressure regulating valve and the second negative pressure switch valve; and the vacuum pump, the first negative pressure regulating valve, the second negative pressure switch valve, the second negative pressure regulating valve and the third negative pressure switch valve are all connected with the second controller.

Optionally, the housing of the negative pressure module has a layered-blocking rigidity-variable structure.

The present disclosure further provides a method of an exoskeleton robot for expectoration assistance, used to realize the above exoskeleton robot for expectoration assistance. The method of the exoskeleton robot for expectoration assistance includes:

acquiring the respiratory signal of the user to be assisted;

determining whether the user to be assisted is in the inhalation state according to the respiratory signal;

when the user to be assisted is in the inhalation state, controlling the housing of the negative pressure module to pump negative pressure and then controlling the negative pressure cavity to pump negative pressure, and after completing the inhalation, controlling the negative pressure cavity to be in direct communication with an external environment;

when the user to be assisted is in the exhalation state, controlling the positive pressure module to inflate; and when the user to be assisted completes the expectoration, controlling the housing of the negative pressure module to be in direct communication with the external environment.

Compared with the prior art, the present disclosure has the following advantages:

The present disclosure provides an exoskeleton robot for expectoration assistance and a method. The robot includes a respiratory sensor, a positive pressure module, a negative pressure module and a control module. Different working modules are triggered according to a respiratory signal of a user to be assisted, so as to assist the user to be assisted in spontaneous expectoration. When the user to be assisted is in an inhalation state, the rigidity of the housing of the negative pressure module increases to meet the pressure requirement of the negative pressure cavity; and the negative pressure cavity intermittently pumps negative pressure to increase the volume of the thoracic cavity of the user to be assisted to assist the patient to inhale. When the user to be assisted is in an exhalation state, the positive pressure module is controlled to inflate, and an impact force is applied to the abdomen of the user to be assisted, so that the volume of the lungs of the user to be assisted instantly shrinks, the exhaled air volume is increased within a certain range, and the flow rate of the respiratory tract is accelerated. By controlling the positive and negative pressure modules of the exoskeleton robot, the corresponding actions are realized to provide a respiratory support for different respiratory phases of the patient, so as to realize the control of the air pressure and flow rate of the respiratory tract of the user to be assisted. As a result, the user to be assisted is assisted to trigger an effective cough to clear airway secretions to realize efficient, non-invasive and intelligent expectoration.

BRIEF DESCRIPTION OF THE DRAWINGS

The present disclosure will be further described below with reference to the accompanying drawings.

DETAILED DESCRIPTION OF THE EMBODIMENTS

The technical solutions in embodiments of the present disclosure will be described in detail below with reference to the accompanying drawings in the embodiments of the present disclosure. Apparently, the described embodiments are merely a part rather than all of the embodiments of the present disclosure. All other embodiments derived from the embodiments in the present disclosure by a person of ordinary skill in the art without creative work shall fall within the protection scope of the present disclosure.

The present disclosure aims to provide an exoskeleton robot for expectoration assistance and a control method, so as to achieve the goal of non-invasive, efficient and intelligent cough assistance for a user to be assisted, and meets the needs of the user to be assisted in recovering the expectoration ability and strengthening the respiratory function exercise.

To make the above-mentioned objectives, features, and advantages of the present disclosure clearer and more comprehensible, the present disclosure will be further described in detail below in conjunction with the accompanying drawings and specific embodiments.

Figure 1:
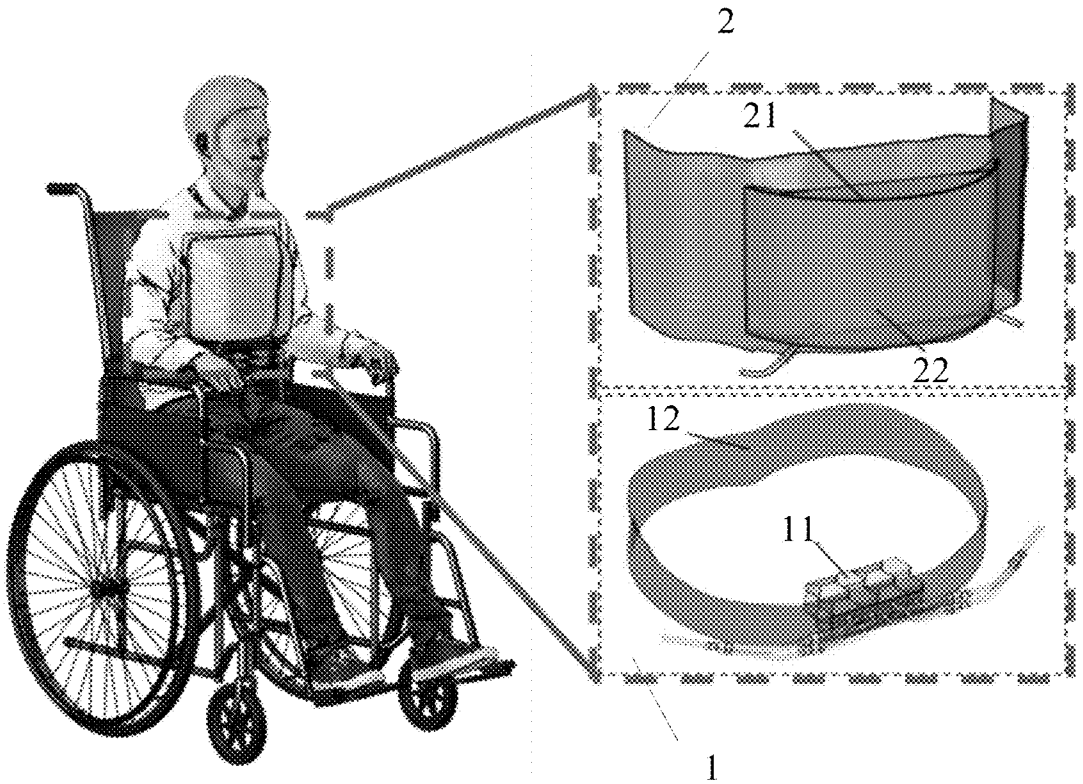
FIG. 1 is a schematic structural diagram of an exoskeleton robot for expectoration assistance provided in the present disclosure.

FIG. 1 is a schematic structural diagram of an exoskeleton robot for expectoration assistance provided in the present disclosure. As shown in FIG. 1, the exoskeleton robot for expectoration assistance provided in the present disclosure includes: a respiratory sensor, a positive pressure module 1, a negative pressure module 2 and a control module.

The respiratory sensor is configured to acquire a respiratory signal of a user to be assisted. The respiratory signal includes: a respiratory flow rate and an airway pressure.

The positive pressure module 1 covers an upper abdomen of the user to be assisted. That is, the positive pressure module 1 covers a midline position of a line connecting the xiphoid process and the navel.

The negative pressure module 2 is arranged on an outer wall of a thoracic cavity of the user to be assisted and wraps the whole thoracic cavity, and a closed cavity is formed between a housing 21 of the negative pressure module and the outer wall of the thoracic cavity of the user to be assisted; the closed cavity is a negative pressure cavity 22; when the user to be assisted needs expectoration, the rigidity of the housing 21 of the negative pressure module increases; and when the user to be assisted completes expectoration, the rigidity of the housing 21 of the negative pressure module decreases. That is, in a non-working state, the housing can be worn lightly and comfortably like a piece of clothing; and in a working state, the rigidity of the housing is changed to meet the pressure requirement of the negative pressure cavity 22.

The control module is respectively connected with the respiratory sensor, the positive pressure module 1 and the negative pressure module 2.

The control module is configured to determine whether the user to be assisted is in an inhalation state according to the respiratory signal; the control module is further configured to control the negative pressure cavity 22 to intermittently pump negative pressure when the user to be assisted is in an inhalation state, and control the negative pressure module 2 to be in direct communication with an external environment after the inhalation is completed; and the control module is further configured to control the positive pressure module 1 to quickly inflate when the user to be assisted is in an exhalation state.

As a specific embodiment, the housing 21 of the negative pressure module has a layered-blocking rigidity-variable structure. The housing 21 of the negative pressure module can also adopt the principle of particle blocking variable rigidity, magnetorheological fluid or intelligent materials (such as temperature-controlled rigidity-variable hydrogels and memory polymers).

That is, by controlling the pressure of the negative pressure cavity 22, the volume of the lungs of the human body is increased to achieve an effect of assisting inhalation. When the housing 21 of the negative pressure module is a layered-blocking housing, in a working state of the exoskeleton robot, a hard shape can be maintained by vacuumizing to ensure the volume of the negative pressure cavity 22, and in a non-working state, a soft shape can be maintained to improve the wearing comfort of the exoskeleton robot.

The housing 21 of the negative pressure module is a layered-blocking housing, that is, by adopting the principle of layered-blocking, two layers of sandpaper particles are stacked outward and sealed with thickened transparent nylon, and real support structures on both sides of the housing further improve the bending rigidity of the housing.

Figure 4:
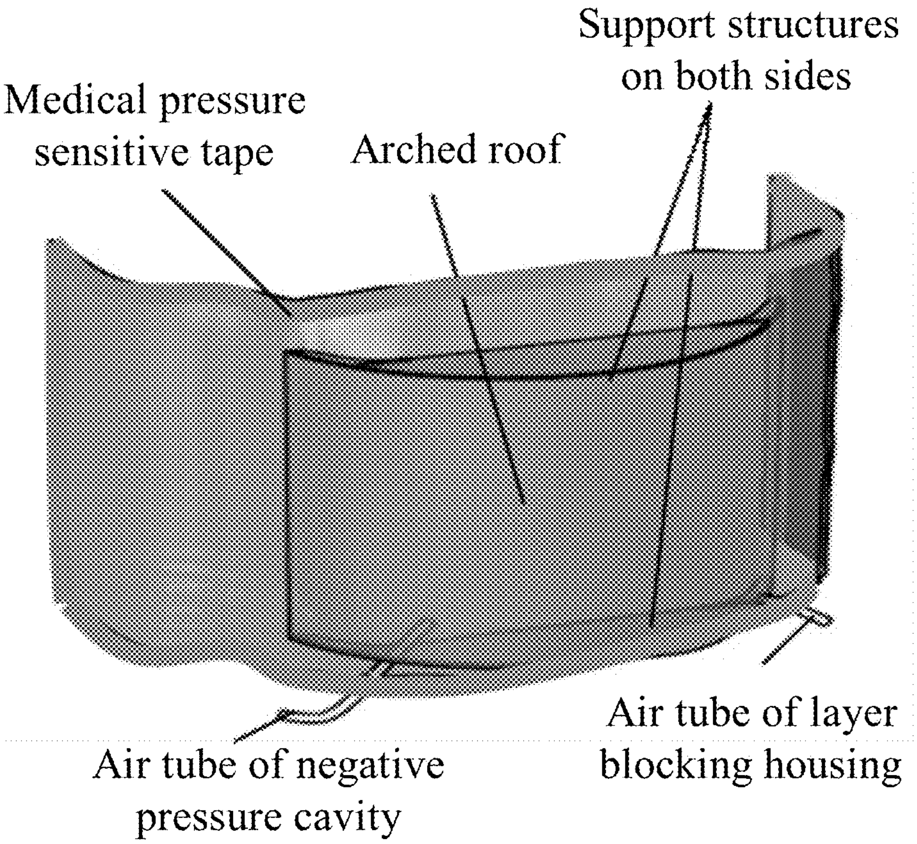
FIG. 4 is a schematic diagram of a negative pressure module provided in the present disclosure.
Figure 5:
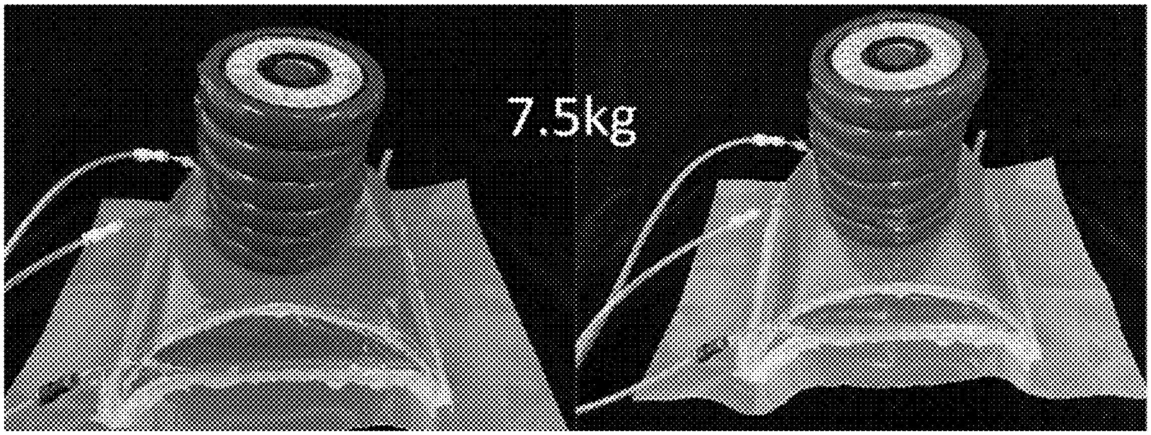
FIG. 5 is a schematic diagram of the negative pressure module provided in the present disclosure in a specific embodiment.

As shown in FIG. 4 and FIG. 5, when the layered-blocking housing is in a free state, the bending rigidity of the housing is smaller, and under the action of a concentrated force, the housing has a larger deformation; and by vacuumizing the layered-blocking housing, the friction force between layers increases sharply under the action of pressure, so that the bending rigidity of the housing is increased, and the shape is prevented from collapsing under the same load.

Specifically, a sealing material is configured to make the housing 21 of the negative pressure module fit with the outer wall of the thoracic cavity of the user to be assisted. The sealing material is sealed with a medical pressure sensitive tape, and can also be sealed in other adsorption modes, such as negative pressure adsorption inspired by octopus tentacles, an adsorption mode inspired by gecko tentacles, or an adsorption mode inspired by remora.

In an inspiratory phase, first, the layered-blocking rigidity housing is vacuumized to increase the bending rigidity of the housing; and then, the negative pressure cavity 22 is vacuumized to generate intermittent negative pressure around the thoracic wall, and the pressure difference between the negative pressure cavity 22 and the human thoracic cavity causes the human thoracic cavity to expand rhythmically, thereby improving the inhaled air volume to achieve the purpose of assisting inhalation.

The positive pressure module 1 includes: a soft drive device 11 and a restraining strap 12.

The soft drive device 11 is fixed on the restraining strap 12, and the soft drive device 11 covers the upper abdomen of the user to be assisted and deforms toward the human body. The soft drive device 11 is made of a stretchable soft material.

As a specific embodiment, the soft drive device 11 is a soft paper folding unit, an inflation tube or an air bag.

When the soft drive device 11 is a soft paper folding unit, a structural form of a Yoshimura paper folding tube is adopted, but is not limited to this.

Figure 2:
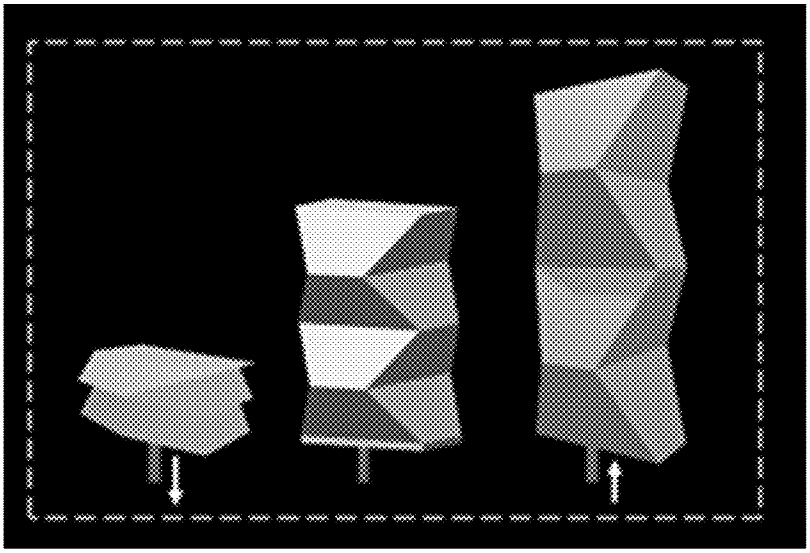
FIG. 2 is a schematic diagram of a deformation pattern of a soft paper folding unit provided in the present disclosure.

As shown in FIG. 2, when the soft drive device 11 is a soft paper folding unit, the soft paper folding unit undergoes dual-mode deformation of "unfolding" and "stretching". The soft paper folding unit is in a contracted state when being not inflated, and the user to be assisted can easily wear the soft paper folding unit; and in an inflated state, the volume of the soft paper folding unit expands, the restraining strap cannot be stretched, and the length remains unchanged. Therefore, the paper folding unit can only expand toward the direction of the human body to achieve the effects of "impacting" and "squeezing" the abdomen, thereby assisting the patient to fully exhale.

The restraining strap 12 is configured to limit the soft drive device 11, and the length of the restraining strap 12 remains unchanged during the deformation of the soft drive device 11. That is, the restraining strap 12 cannot be stretched, and the length remains unchanged. Therefore, the paper folding unit can only expand toward the direction of the human body to achieve the effects of "impacting" and "squeezing" the abdomen, thereby assisting the patient to fully exhale.

Figure 3:
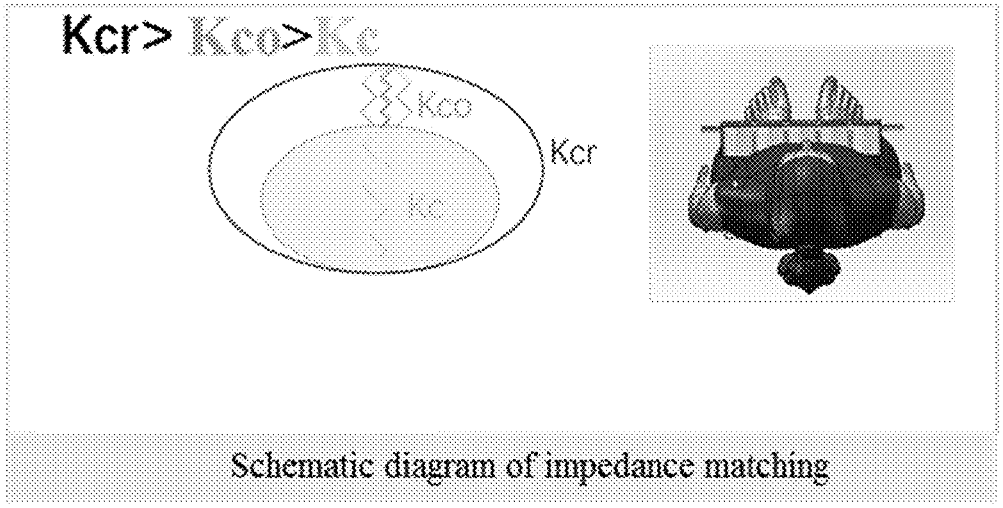
FIG. 3 is a schematic diagram of impedance matching of a positive pressure module provided in the present disclosure.

As shown in FIG. 3, Kcr is tensile rigidity of the restraining strap, Kc is impedance of human abdomen, and Kco is impedance of soft paper folding unit i.e. the impedance of the soft drive device, wherein the tensile rigidity of the restraining strap 12 is greater than the impedance of the soft drive device 11.

The control module includes: a positive pressure control unit and a negative pressure control unit.

The positive pressure control unit is configured to control the inflation and deflation time and pressure magnitude of the soft drive device 11.

The negative pressure control unit is configured to control the pressure of the housing 21 of the negative pressure module and the negative pressure cavity 22.

The positive pressure control unit includes: a positive pressure pump, a positive pressure regulating valve, a positive pressure switch valve, a first negative pressure switch valve and a first controller.

The positive pressure pump, the positive pressure regulating valve, the positive pressure switch valve and the first negative pressure switch valve are all connected with the first controller; and both the positive pressure switch valve and the first negative pressure switch valve are in communication with the soft drive device 11.

The positive pressure pump is configured to provide an air source; the positive pressure regulating valve is configured to adjust the magnitude of output pressure; the positive pressure switch valve is configured to control the switching of an air channel; and in order to realize quick deflation, the first negative pressure switch valve is arranged, and the first negative pressure switch valve is configured to assist the paper folding unit to deflate quickly and maintain a compressed state.

Moreover, in order to conveniently display the current pressure, the positive pressure control unit further includes an intelligent digital pressure gauge.

The output force and the rapidity of time response of the soft paper folding unit are related to the pressure inside the soft paper folding unit, which can be controlled by the positive pressure regulating valve. By arranging the pressure regulating valve to control the output pressure, the output force of the soft paper folding unit can be adjusted, so as to be suitable for users to be assisted with different abdominal compliances. In addition, in order to ensure safety and comfort during use, a maximum output pressure limit is set. When the pressure inside the soft paper folding unit exceeds the limited maximum pressure value, the positive pressure switch valve will be automatically closed to prevent the excessive pressure inside the soft paper folding unit from causing extreme deformation or even blasting, thereby ensuring the safety during use.

The negative pressure control unit includes: a vacuum pump, a first negative pressure regulating valve, a second negative pressure switch valve, a second negative pressure regulating valve, a third negative pressure switch valve and a second controller.

The vacuum pump is in communication with the housing 21 of the negative pressure module through the first negative pressure regulating valve and the second negative pressure switch valve.

The vacuum pump is in communication with the negative pressure cavity 22 through the second negative pressure regulating valve and the second negative pressure switch valve.

The vacuum pump, the first negative pressure regulating valve, the second negative pressure switch valve, the second negative pressure regulating valve and the third negative pressure switch valve are all connected with the second controller.

The vacuum pump provides negative pressure, the negative pressure regulating valve adjusts the negative pressure, and then, the second negative pressure switch valve controls the switching of the air channel.

As a specific embodiment, the first controller and the second controller are both single chip microcomputers, that is, the single chip microcomputers are configured to control the switch valves of positive and negative pressure control modules. The positive pressure switch valve realizes the control of the inflation time, pressure and output force of the soft paper folding unit through the switching of the valve; and the negative pressure switch valve realizes the control of the layered-blocking hardness and the pressure of the negative pressure cavity 22 through the switching of the valve. By using the positive and negative pressure regulating valves to control the pressure of the soft paper folding unit and the negative pressure cavity 22, the regulation of an auxiliary effect of the exoskeleton robot is realized; by using the single chip microcomputers to set the control times of the positive pressure switch valve and the negative pressure switch valve, sequential actions of the positive and negative pressure modules 2 can be realized; and by setting the number of cycles, the number of respiratory cycles of expectoration assisted by the exoskeleton robot can be realized, and finally, the dynamic characteristics of the air flow in the human airway during the simulation of natural coughing under the assistance of the robot can be realized.

The pressure of the negative pressure cavity 22 is controlled by the negative pressure regulating valve, and through the pressure of the negative pressure cavity 22, inhalation assistance can be performed for patients with different thoracic cavity compliances. In addition, in order to ensure the safety of inhalation assistance and prevent the discomfort and skin injury caused by excessive pressure, a maximum negative pressure threshold is set. When the pressure of the negative pressure cavity 22 exceeds the limited negative pressure range, the negative pressure switch valve is automatically closed to ensure the comfort during use.

Figure 6:
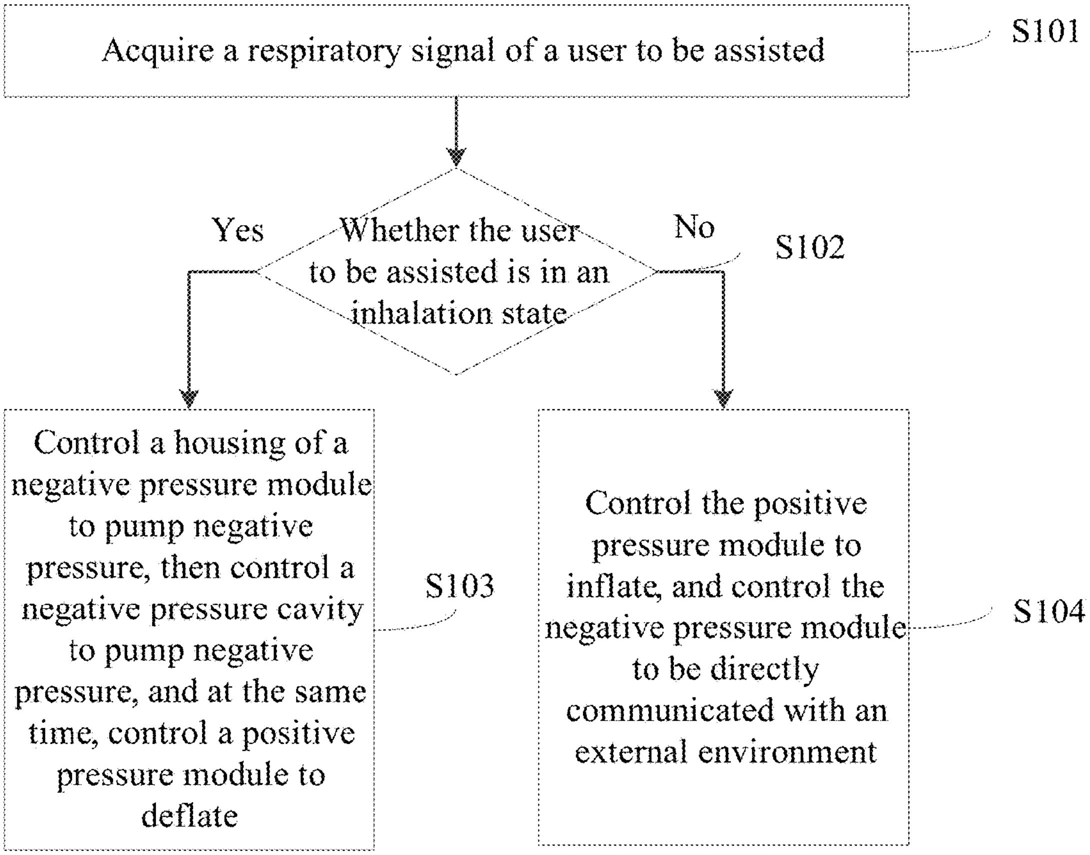
FIG. 6 is a schematic diagram of a control method of an exoskeleton robot for expectoration assistance provided in the present disclosure.

FIG. 6 is a schematic diagram of a control method of an exoskeleton robot for expectoration assistance provided in the present disclosure. As shown in FIG. 6, the control method of the exoskeleton robot for expectoration assistance provided in the present disclosure is configured to realize the exoskeleton robot for expectoration assistance, including:

S101: a respiratory signal of a user to be assisted is acquired, where the respiratory signal includes: a respiratory flow rate and an airway pressure;

S102: whether the user to be assisted is in an inhalation state is determined according to the respiratory signal;

S103: when the user to be assisted is in an inhalation state, the housing 21 of the negative pressure module is controlled to pump negative pressure and then the negative pressure cavity 22 is controlled to pump negative pressure, and after the inhalation is completed, the negative pressure module 2 is controlled to be in direct communication with an external environment;

S104: when the user to be assisted is in an exhalation state, the positive pressure module 1 is controlled to quickly inflate; and when the user to be assisted completes the expectoration, the housing of the negative pressure module 2 is controlled to be in direct communication with the external environment.

The present disclosure adopts a soft robot technology, the positive pressure module 1 adopts a soft paper folding unit, and the negative pressure module 2 adopts a variable rigidity driving principle. In an inspiratory phase, the pressure of the negative pressure cavity 22 is controlled to assist the expansion of the volume of the human thoracic cavity. In an expiratory phase, the soft paper folding unit is configured to generate an impact force on the abdomen of a patient, and the auxiliary diaphragm moves up quickly to reduce the volume of the thoracic cavity. Both the inspiratory phase and the expiratory phase adopt a mode of external assistance to realize the control of the air pressure and flow rate of the respiratory tract of the patient, thereby assisting the patient to trigger an effective cough to clear airway secretions. This method does not destroy a natural negative pressure state of the human thoracic cavity. Compared with traditional expectoration methods such as tracheostomy and mechanical respiration, the auxiliary method is more in line with the human physiology, has almost no side effects, and also avoids a series of side effects such as tracheal infection, alveolar collapse and deterioration of the respiratory function, thereby making expectoration assistance from ICU into daily life.

The exoskeleton robot for expectoration assistance uses a soft drive device 11 (soft paper folding unit) and a rigidity-variable housing. Compared with a traditional rigid exoskeleton, the wearing comfort and safety are improved.

The exoskeleton robot for expectoration assistance has the characteristics of variable volume and variable rigidity, and realizes both performance and portability. The advantage of variable volume is mainly due to the fact that the soft drive device 11 adopts a paper folding unit structure. The soft paper folding unit is in a contracted state when being not inflated, and the patient can easily wear the soft paper folding unit. In an inflated state, the volume of the soft paper folding unit expands so as to effectively "impact" and "squeeze" the abdomen. The advantage of variable rigidity is mainly due to the fact that the negative pressure module 2 adopts the layered-blocking principle to realize the rigidity change which is safe, reliable and fast. In a non-working state of the robot, the layered-blocking housing is soft enough, and the impedance of the layered-blocking housing is smaller than the impedance of the human body, thereby improving the wearing comfort. In a working state of the robot, the rigidity of the housing is improved by controlling the vacuum pressure.

The embodiments of the present disclosure are described in detail above with reference to the accompanying drawings, but the present disclosure is not limited to the above embodiments. Within the knowledge of a person of ordinary skill in the art, various variations can also be made without departing from the spirit of the present disclosure.

What is claimed is:

1. An exoskeleton robot for expectoration assistance, comprising: a respiratory sensor, a positive pressure module, a negative pressure module, and a control module, wherein:

the respiratory sensor is configured to acquire a respiratory signal of a user to be assisted, the respiratory signal comprising a respiratory flow rate and an airway pressure;

the positive pressure module configured to cover an upper abdomen of the user to be assisted;

the negative pressure module is configured to be arranged on an outer wall of a thoracic cavity of the user to be assisted and is configured to wrap the whole thoracic cavity, wherein a closed cavity is formed between a housing of the negative pressure module and the outer wall of the thoracic cavity of the user to be assisted, the closed cavity being a negative pressure cavity;

wherein, when the user to be assisted needs expectoration, a rigidity of the housing of the negative pressure module increases; and wherein, when the user to be assisted completes expectoration, the rigidity of the housing of the negative pressure module decreases;

the control module is respectively connected with the respiratory sensor, the positive pressure module, and the negative pressure module;

the control module is configured to:

determine whether the user to be assisted is in an inhalation state according to the respiratory signal;

control the negative pressure cavity to intermittently pump negative pressure when the user to be assisted is in an inhalation state, control the negative pressure module to be in direct communication with an external environment after the inhalation is completed; and control the positive pressure module to inflate when the user to be assisted is in an exhalation state.

2. The exoskeleton robot for expectoration assistance according to claim 1, wherein the positive pressure module comprises: a soft drive device and a restraining strap; and wherein:

the soft drive device is fixed on the restraining strap, the soft drive device configured to cover the upper abdomen of the user to be assisted and deform toward the user;

the restraining strap is configured to limit deformation of the soft drive device, a length of the restraining strap remaining unchanged during the deformation of the soft drive device; and a tensile rigidity of the restraining strap is greater than an impedance of the soft drive device.

3. The exoskeleton robot for expectoration assistance according to claim 2, wherein the soft driver is a soft paper folding unit, an inflation tube, or an air bag.

4. The exoskeleton robot for expectoration assistance according to claim 2, wherein the control module comprises: a positive pressure control unit and a negative pressure control unit; wherein:

the positive pressure control unit is configured to control an inflation and deflation time and pressure magnitude of the soft drive device; and the negative pressure control unit is configured to control the pressure of each of the negative pressure cavity and the housing of the negative pressure module.

5. The exoskeleton robot for expectoration assistance according to claim 4, wherein:

the positive pressure control unit comprises: a positive pressure pump, a positive pressure regulating valve, a positive pressure switch valve, a first negative pressure switch valve, and a first controller;

the positive pressure pump, the positive pressure regulating valve, the positive pressure switch valve and the first negative pressure switch valve are all connected with the first controller; and both the positive pressure switch valve and the first negative pressure switch valve are in communication with the soft drive device.

6. The exoskeleton robot for expectoration assistance according to claim 4, wherein the negative pressure control unit comprises: a vacuum pump, a first negative pressure regulating valve, a second negative pressure switch valve, a second negative pressure regulating valve, a third negative pressure switch valve, and a second controller; wherein:

the vacuum pump is in communication with the housing of the negative pressure module through the first negative pressure regulating valve and the second negative pressure switch valve;

the vacuum pump is in communication with the negative pressure cavity through the second negative pressure regulating valve and the second negative pressure switch valve; and the vacuum pump, the first negative pressure regulating valve, the second negative pressure switch valve, the second negative pressure regulating valve and the third negative pressure switch valve are all connected with the second controller.

7. The exoskeleton robot for expectoration assistance according to claim 1, wherein the housing of the negative pressure module has a layered-blocking rigidity-variable structure.

8. A method of using the exoskeleton robot according to claim 1, comprising:

acquiring the respiratory signal of the user to be assisted;

determining whether the user to be assisted is in the inhalation state according to the respiratory signal;

when the user to be assisted is in the inhalation state, controlling the housing of the negative pressure module to pump negative pressure and then controlling the negative pressure cavity to pump negative pressure; and, after completing the inhalation, controlling the negative pressure cavity to be in direct communication with an external environment;

when the user to be assisted is in the exhalation state, controlling the positive pressure module to inflate; and when the user to be assisted completes the expectoration, controlling the housing of the negative pressure module to be in direct communication with the external environment.

9. The method according to claim 8, wherein the positive pressure module comprises: a soft drive device and a restraining strap, the soft drive device fixed on the restraining strap; the method further comprising:

covering the upper abdomen of the user to be assisted with the soft drive device and deforming the soft drive device toward the user; and limiting deformation of the soft drive device with the restraining strap, a length of the restraining strap remaining unchanged during the deformation of the soft drive device;

wherein a tensile rigidity of the restraining strap is greater than an impedance of the soft drive device.

10. The method according to claim 9, wherein the soft drive device is a soft paper folding unit, an inflation tube, or an air bag.

11. The method according to claim 9, wherein the control module comprises: a positive pressure control unit and a negative pressure control unit; wherein:

the positive pressure control unit is configured to control an inflation and deflation time and pressure magnitude of the soft drive device; and the negative pressure control unit is configured to control the pressure of each of the negative pressure cavity and the housing of the negative pressure module.

12. The method according to claim 11, wherein the positive pressure control unit comprises: a positive pressure pump, a positive pressure regulating valve, a positive pressure switch valve, a first negative pressure switch valve, and a first controller;

wherein the positive pressure pump, the positive pressure regulating valve, the positive pressure switch valve and the first negative pressure switch valve are all connected with the first controller; and wherein both the positive pressure switch valve and the first negative pressure switch valve are in communication with the soft drive device.

13. The method according to claim 11, wherein the negative pressure control unit comprises: a vacuum pump, a first negative pressure regulating valve, a second negative pressure switch valve, a second negative pressure regulating valve, a third negative pressure switch valve and a second controller; wherein:

the vacuum pump is in communication with the housing of the negative pressure module through the first negative pressure regulating valve and the second negative pressure switch valve;

the vacuum pump is in communication with the negative pressure cavity through the second negative pressure regulating valve and the second negative pressure switch valve; and the vacuum pump, the first negative pressure regulating valve, the second negative pressure switch valve, the second negative pressure regulating valve, and the third negative pressure switch valve are all connected with the second controller.

14. The method according to claim 8, wherein the housing of the negative pressure module has a layered-blocking rigidity-variable structure.

* * * * *